United States Patent [19]

Rein

[11] 4,026,793

[45] May 31, 1977

[54] AEROBIC SEWERAGE DIGESTION PROCESS (42 C. PROCESS)

[76] Inventor: David A. Rein, Star Rte. 1, Box 358B, Bremerton, Wash. 98310

[22] Filed: Aug. 21, 1975

[21] Appl. No.: 606,499

[52] U.S. Cl. .................................... 210/12; 210/15
[51] Int. Cl.² ........................................ C02C 1/14
[58] Field of Search ........................ 210/2–9, 210/10, 11, 12, 15, 18; 71/9, 12

[56] References Cited

UNITED STATES PATENTS

| | | | |
|---|---|---|---|
| 2,875,151 | 2/1959 | Davidson | 210/4 |
| 3,025,151 | 3/1962 | Berg et al. | 71/9 |
| 3,337,448 | 8/1967 | Rich | 210/12 |
| 3,607,737 | 9/1971 | Gamer | 210/12 |
| 3,715,304 | 2/1973 | Hefermehl | 210/3 |
| 3,730,883 | 5/1973 | Lefrancois | 210/7 |
| 3,892,660 | 7/1975 | Romell | 210/12 |

*Primary Examiner*—Frank A. Spear, Jr.
*Assistant Examiner*—Peter A. Hruskoci
*Attorney, Agent, or Firm*—Christensen, O'Connor, Garrison & Havelka

[57] ABSTRACT

An aerobic digestion process for reducing the solids content of an aqueous biodegradable organic sludge includes the steps of (a) introducing the sewage sludge into a vessel, the initial concentration of the total volatile organic solid in the sludge being less than about 2.5% by weight based on the total sludge present in the vessel, (b) maintaining the total volatile solids concentration at less than about 2.5% by weight; and (c) maintaining the temperature of the sludge in the vessel within the range of from about 38° to about 46° C. By processing the sludge according to the foregoing steps, including temperature maintenance within the foregoing critical limits and maintaining the total volatile solids concentration below the critical limit of about 2.5% by weight, the solids concentration of a sludge, such as a waste-activated sewage sludge, can be significantly reduced in a time period on the order of about three days. In addition to the above process parameters, it is preferred that the concentration of dissolved oxygen in the sludge be maintained at a level greater than about 3 milligrams per liter (mg/l). The waste material produced from the foregoing process exhibits a volatile solids reduction on the order of 50% to 60%.

6 Claims, 3 Drawing Figures

AEROBIC SEWERAGE DIGESTION PROCESS (42 C. PROCESS)

BACKGROUND OF THE INVENTION

The present invention relates to a method for treating sludges containing biodegradable organic solids, and more particularly relates to a processing technique for aerobically digesting waste sludges, and particularly waste-activated sewage sludges, to produce an end product with a substantially reduced volatile solids content.

The present invention is based on the subject matter of a dissertation entitled "Improved Aerobic Digestion through Temperature and Solids Control" by D. A. Rein, University of Colorado, October 1974, expressly incorported herein by reference.

Sludges accumulated in waste water treatment are broadly classified as raw (primary) sludge, chemical sludge, and biological sludge. Raw sludge is the semi-liquid slurry by-product derived from the physically separated solids from waste water. The major portion of the solids present in raw sludge is organic in nature. Chemical sludge is the slurry by-product derived from physical separation processes, such as sedimentation, filtration or flotation, that have been enhanced by the addition of a composition of matter that facilitates the solid-liquid separation. The characteristics of chemical sludges depend upon the separation enhancing composition used. The major proportion of chemical sludges generally comprises inorganic precipitates. A biological sludge is the slurry by-product derived from treatment processes in which dissolved organic material is biologically assimilated. The predominant portion of the solids derived from biological assimilation processes is organic in nature. Among the most difficult and expensive of the foregoing sludges to treat is the biological sludge, especially those produced by an activated sludge process used in conventional waste water treatment facilities. Such biological sludges, broadly referred to as secondary sludges, have a relatively high water content, poor dewatering properties, and are highly putrescible.

Many secondary sludge treatment and disposal processes are disclosed in the literature. The broad goal of all these processes is the economical alteration of the sludge characteristics so that the sludge can be returned to the environment in a safe, economical and beneficial manner. Objectives included within this primary goal, which are common to most of the prior art treatment and disposal processes, are to reduce the sludge volume by removal of a portion of the liquid fraction, to destroy the pathogens present in the sludge, to produce a useful by-product, and to stabilize or decompose the organic fraction in the sludge.

Anaerobic digestion has traditionally been used for sludge stabilization. During anaerobic digestion the organic material present in the sludge is partially oxidized to by-products such as organic acids, ammonia, methane and hydrogen sulphide. The major justification for anaerobic digestion is that it does partially decompose the organic matter in the sludge and render the sludge more acceptable for final disposal. Although the anaerobic digestion process is reasonably well understood, it still presents many operating difficulties and has a relatively high cost of operation. Moreover, a waste-activated sewage sludge is particularly difficult to stabilize by anaerobic digestion.

Aerobic digestion, an alternative biological stabilization process, has an inherent advantage over anaerobic digestion. Aerobic digestion more efficiently consumes the substrate materials in the sludge and consequently produces a more highly oxidized end product. In addition, aerobic digestion requires less supervision of and less capital expenditure in processing equipment than does anaerobic digestion, making the aerobic digestion process particularly attractive for small and modified waste water treatment plants. Aerobic digestion also produces a highly nitrified sludge, which makes the process an ideal pretreatment for sludge slated for land disposal.

Aerobic digestion is a complex biological process influenced by environmental factors such as temperature, solids concentration, oxygen concentration and pH. These factors affect not only the rate of metabolism of a given group of microorganisms, but also the type of microorganisms that develop and accomplish the decomposition of the organic matter. The type of microorganisms that are developed during the process determine both the operating characteristics of the process and the physical characteristics of the end products.

SUMMARY OF THE INVENTION

The present invention provides an aerobic digestion process for a waste water sludge that produces an end product having a substantially reduced solids content in a relatively short amount of time. More specifically, the present invention provides an aerobic digestion process that, when operated within certain process parameters, will result in an end product with a reduction in solids content on the order of from 50 to 60% with a detention time of about 3 days. These parameters include crictical processing temperatures and solids concentration and a preferred oxygen concentration maintenance in the sludge during processing. Accordingly, an organic sludge can be digested by placing the sludge in an aerobic digestion vessel, the initial solids concentration of the sludge being below about 2.5% by weight, maintaining the total volatile solids concentraton at less than about 2.5% by weight, and maintaining the temperature of the sludge during its retention in the vessel at a temperature within the range of from 38° to about 46° C. The aerobic digestion process of the present invention is preferably conducted at a temperature on the order of 42° C. and at a solids concentration of about 2% by weight. These operating conditions induce development of a significant population of the protozoa Monadidae that consume the biodegradable material at a very high rate. On a batch basis these organisms appear after three days of digestion, and on a continuous basis can be maintained with a three day detention time.

DESCRIPTION OF THE PREFERRED EMBODIMENT

Figure 1:
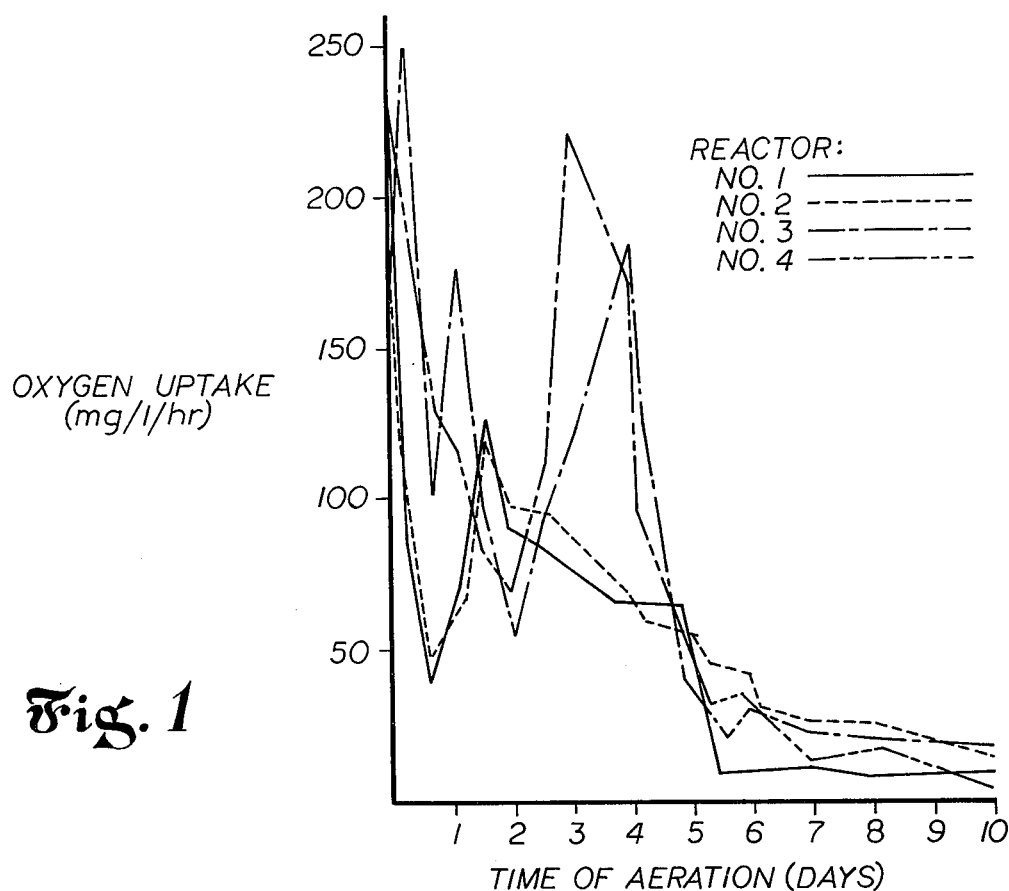
FIGS. 1, 2, and 3 are graphs showing test data from the Examples illustrating the oxygen uptake rate of the digesting sludge, the protozoa density, and the oxygen uptake rate, respectively, versus days of digestion at given temperatures.

Broadly speaking, any biodegradable, aqueous organic sludge can be digested in accordance with the process of the present invention. For purposes of definition, the term "sludge" as used herein is a semi-liquid or relatively solid aqueous mixture containing organic materials that are biodegradable by the action of microorganisms. Such a sludge can also contain inorganic materials. Examples of such sludges are industrial sludges such as animal feed lot sludges, paper processing sludges, and primary and secondary sewages sludges.

The aerobic digestion process of the present invention can be carried out in conventional aerobic digesting vessels that have been provided with a means to control temperature within a given range of a few degrees Centigrade. It is preferred that the digestion process be conducted on a continuous flow basis. Aeration of the sludge in the digesting vessel is necessary to maintain the aerobic digestion process of the present invention. During the residence time of the sludge in the digesting vessel, the dissolved oxygen in the sludge is preferably maintained at a concentration on the order of 3 mg/l (milligram per liter) or greater. This level of dissolved oxygen is somewhat higher than is required by conventional aerobic digestion processes, but can be maintained by air aeration in conventional digesting vessels. If the dissolved oxygen concentration falls below about 3 mg/l, the level of biological activity is reduced, and if the dissolved oxygen is allowed to remain below 3 mg/l for any significant time, the protozoa necessary to obtain the results of the present invention may not evolve. Even though a higher than conventional level of dissolved oxygen is required for the present invention, it is preferred that this level be maintained by aeration rather than by the addition of pure oxygen to the digestion system. The addition of pure oxygen may also have an adverse effect on the desired microorganisms.

In accordance with the present invention, an organic, biodegradable sludge is placed in the digesting vessel and is maintained at a temperature within the range of from about 38° to about 46° C. Maintenance of the temperature within the range is critical to obtaining the results of the present invention. When the temperature of the sludge in the digesting vessel is maintained within the critical range of 38° to 46° C., the protozoa Monodidae develop, which rapidly reduce the solids content in the sludge. These microorganisms are discussed in more detail below. If the temperature of the sludge during processing is allowed to vary below or above the limits of the foregoing critical range, the protozoa may not develop, resulting in a sludge that contains significantly more solids at the end of residence times required by the present invention. Best results are obtained in accordance with the present invention if the temperature of the sludge in the digesting vessel is maintained between the range of 38° to 42° C. Maintaining the temperature within this latter range with a detention time of about 3 days will produce an end product sludge in which the solids concentration is reduced on the order of 50 to 60%. To achieve these results, the sludge normally must be digested for approximately three days, preferably digesting from 3 to 6 days. Optimum results are obtained when the sludge is maintained at a relatively constant temperature on the order of about 42° C.

Another parameter critical to obtaining the results of the present invention is the solids concentration. The solids concentration referred to herein are the total volatile solids (TVS) in the sludge. When a percentage of TVS is referred to, the percentage is by weight based upon the total aqueous sludge present in the system. It is critical that a sludge processed in accordance with the present invention have an initial TVS concentration of less than about 2.5% by weight when the sludge is charged into the digesting vessel. It is most preferred that the total volatile solids concentration be maintained at less than about 2% by weight during the entire digesting period so as to achieve optimum solids reduction. If the percentage of TVS is allowed to rise about 2.5% by weight, the protozoa monodidae that contribute to the rapid reduction of solids in the sludge will not develop, resulting in a much longer residence time to achieve the same results.

It is believed that the high degree of solids reduction produced by the process of the present invention results from the development of the protozoa monadidae that are highly active and that require a high energy conversion to reproduce and live. When a sludge is processed according to the present invention within the critical temperature ranges and solids concentrations, these protozoa will proliferate and consume large quantities of organic material. The microorganism succession is characterized by the dissappearance of the feed sludge protozoa and the appearance of the monadidae protozoa, on a batch feed basis, within about three days after the beginning of aeration in a digesting vessel. The protozoa population peaks between 2 and 4 days of digestion and begins to disappear on about the fourth day of digestion. The monadidae protozoa are believed to be the important microorganism in producing the fast and substantial reduction of solids in the sludge according to the present invention. At temperatures above the preferred range of about 36° to 42° C., the development of the foregoing organism is inhibited. At temperatures above 46° C., the organisms do not develop and thus significantly reduce the rate of solids reduction. At temperatures below about 36° C., the foregoing microorganisms do not appear in any substantial or significant quantity. As a result, the solids reduction at the end of three days drops off considerably, taking it outside the purview of the present invention.

When the critical processing parameters set forth are adhered to, a sludge retention time in the digesting vessel of on the order of less than 5 days, and normally on the order of three days will produce a sludge that has experienced a volatile solids reduction of on the order of 50 to 60%. By using the process of the present invention, the sludge treating capacity of existing aerobic digestion plants can be increased beyond their original sludge handling design capacity. Moreover, new digesting plants that require only a third of the digesting capacity to produce the same amount of digested sludge can be designed in accordance with the invention. In other words, the capacity of existing plants can be more than doubled by incorporating the process of the present invention. New plants can be designed to handle the same quantity of sludge as an existing plant, but requiring only about one third of the processing equipment, thus greatly reducing the capital expenditure required to treat a given quanitity of biodegradable sludge. The sludge produced by the process of the present invention can be further treated in accordance with conventional techniques, can be dewatered, or can otherwise be disposed of in a conventional manner.

EXAMPLES

The following laboratory procedures and processing results are intended to provide one of ordinary skill in the art with sufficient knowledge to aerobically digest an organic sludge in accordance with the present invention. The examples are not intended to delimit the invention, but are intended to typify normal, laboratory scale, operating procedures within the critical limitations set forth above. The sludge utilized in the following examples was waste activated sludge obtained from the Metropolitan Denver Sewage Disposal District Plant, Denver Colo. The sludge, as obtained from the treatment plant, had a solids concentration of from 5,000 to 10,000 mg.l (0.5% to 1.0% by weight) and a theoretical sludge age of 3 to 7 days. When a sludge having a concentration of less than about 1.5% by weight was used for a given experimental digesting run, the sludge was allowed to settle for approximately one hour in a 30 gallon tank, after which time the supernatant was decanted. When a sludge concentration of greater than 1.5% to 2% was desired for a given experimental digesting run, the sludge was mixed with a polymer, Dow C31, and again allowed to settle for approximately one hour. The supernatant was again decanted and the sludge was then placed on a fine screen to allow the free water to gravity drain to further concentrate the sludge. When both low and high solids concentrations were required in the same experimental run, the sludge with low solids concentration was obtained by diluting the screened sludge with deionized water. It was found during the experimental program that sludge pretreatment variations did not significantly affect subsequent results from processing.

The experimental runs were started by bringing the sludge sample to the stated temperature and dissolved oxygen levels as quickly as possible. The contents of the reactors were mixed and aerated for approximately 30 minutes before the initial sample was drawn.

The laboratory process apparatus was designed to provide positive temperature, dissolved oxygen, and aeration control. The basic bench scale digesting vessel was a 5-foot section of 6-inch ID plastic pipe, which was provided with a cap on one end to close the bottom of the vessel. The axial dimension of the vessel was vertically oriented. When the vessel was filled with 20 liters of sludge, it had a freeboard of approximately one foot below its open top end. Four portholes were provided at spaced locations along the pipe for observation of the physical conditions of the digesting sludge within the vessel. Level indicators were installed for volume measurement and to indicate the need for evaporation loss makeup. Two 3-inch diameter impellers were mounted on a 5/16-inch diameter stainless steel shaft, which was driven by a 1/25 H.P. variable speed motor. The two impellers were positioned at one and eighteen inches above the bottom of the vessel. The impellers were operated at 625 RPM and created a high level of turbulence that kept the solids in suspension with mimimum swirl and vortex.

An aeration inlet port was mounted in the bottom of the vessel directly below the bottom impeller. The inlet port was coupled to suitable rotometers and control valves for flow measurement and regulation. An aeration gas flow control system included the capability of supplying pure oxygen or air, or any desired combination of the two.

Temperature control was achieved by two methods. In the first method, the vessel was placed in a temperature control room that was maintained at the desired reactor temperature. In the second method, a heating tape was wrapped around the outside of the vessel. The temperature of the vessel was maintained by regulating the voltage input to the heating tape with a suitable controller.

The vessels were operated under both continuous flow and batch conditions. Any evaporation loss from the sludge during a run was made up by addition of deionized water. Test samples were drawn at regular intervals. The oxygen or air flow, dissolved oxygen concentration, oxygen uptake rate, sludge community characteristics, and pH were all recorded at these intervals. Readings on some parameters such as dissolved oxygen concentration and temperature were taken as often as practical during startup to assure that the desired run conditons were quickly reached and were maintained for the digestion.

In accordance with a predetermined schedule, 250 ml samples were drawn for analysis and preserved if required with two ml of a 40 mg/l $HgCl_2$ solution. The samples were than stored at 3° C. until all analyses had been performed.

The total volatile and fixed solids were determined in accordance with *Standard Methods for the Examination of Water and Wastewater*, 13th Edition, American Public Health Association, Washington, D.C. (1971), expressly incorporated herein by reference, with the exception that 50 ml samples were used and fired for 30 minutes. The pH was determined with a Beckman pH probe in accordance with *Standard Methods*, supra. The dissolved oxygen content of the sludge was determined by the membrane electrode method using a P/S Galvanic Cell Oxygen Analyzer in accordance with *Standard Methods*, supra. Determinations were made using a BOD (biological oxygen demand) bottle for solids concentrations up to 3%. Higher solids concentrations required that the sample be placed in a 125 ml Erlenmyer flask so that adequate mixing could be developed. Oxygen uptake (respiration) rates were determined with the same basic apparatus as that described above for the dissolved oxygen test. The probe was left in the sample and the stirring continued while readings of the dissolved oxygen were recorded as a function of time on a Heath Servo Recorder Model 5M-20A. This test provided a relative indication of the rate at which the organism would take up oxygen under the specified test conditions. Estimates of fauna density were obtained from microscopic examinations of sludge samples. A known sample volume, 0.065 ml, was placed on a slide. A plastic cover plate, 48.35 $mm^2$, was then placed over the sample. This provided a sample thickness of 0.135 cm. A calibrated Whipple ocular micrometer was used for counting within a known field of vision, 1.15 × $10^{-2} cm^3$. Three random counts were made, averaged, and multiplied by the scale factor of 8.7 × $10^4$ to give the estimated organisms per liter. The Whipple micrometer was also used to estimate the size of the organism to aid in general indentification. Spot checks were made with a standard blood cell counting chamber to verify the results obtained with the Whipple micrometer. The Whipple micrometer is standard laboratory equipment. Microscopic examinations of the sludge were made on both the samples prepared for the fauna density determination and fixed slides. The fixed slides were prepared and stained with Hickers crystal violet.

It was through analysis of the batch processing results that the potential for utilizing the protozoa, Monadidae, for high rate continuous aerobic digestion was discovered. The results described by Examples I and II show this potential.

EXAMPLE I

Four batch reactors were run simultaneously in accordance with the foregoing procedure. The sludge in reactor No. 1 was held at a constant temperature of 31° C. for a period of 7.5 days. The sludge in reactor No. 1 had an intitial dissolved oxygen content of 4 mg/l and an initial TVS concentration of 0.84%. The sludge in reactor No. 1 was continuously aerated with air. The sludge in reactor No. 2 was held at a constant temperature of 31° C. for a period of 7.5 days. The sludge in reactor No. 2 had an initial dissolved oxygen content of 17 mg/l and an initial TVS concentration of 0.84%. The sludge in reactor No. 2 was continuously aerated with pure oxygen. The sludge in reactor No. 3 was held at a constant temperature of 41° C. for a period of 7.5 days. The sludge in reactor No. 3 had an initial dissolved oxygen content of 2 mg/l and an initial TVS concentration of 0.79%. The sludge in reactor No. 3 was continuously aerated with air. The dissolved oxygen content was quickly brought above 3 mg/l after aeration began. The sludge in reactor No. 4 was held at a constant temperature of 41° C. for a period of 7.5 days. The sludge in reactor No. 4 had an initial dissolved oxygen content of 15 mg/l and an initial TVS concentration of 0.76%. The sludge in reactor No. 4 was continuously aerated with pure oxygen.

The oxygen uptake rate in mg/l per hour was periodically determined in accordance with the procedure set forth above over the 7.5 day digestion period. The results of the oxygen uptake determinations are set forth in the graph of FIG. 1. For both the air aeration and the oxygen aeration at 41° C. a significant peak in oxygen uptake occurred between the second and fifth days of the digestion period. This oxygen uptake rate is directly related to the density of microorganisms in the sludge.

Figure 2:
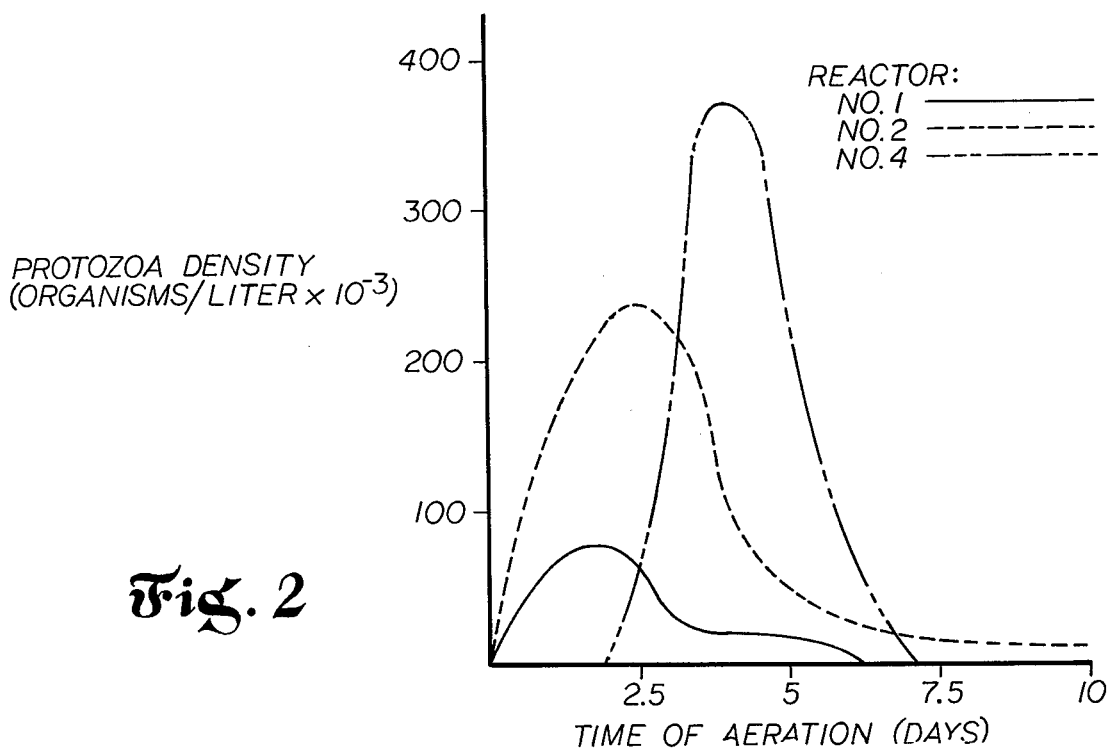

Protozoa density measurements in organisms per liter x $10^{-3}$ were made for the sludge in reactors No's. 1, 2 and 3 at intervals during the digestion period in accordance with the procedures described above. The protozoa density of the sludge in reactor No. 3 peaked at about 3½ days, as shown in the graph of FIG. 2, corresponding to the oxygen uptake peak for the sludge in reactor No. 1 shown in FIG. 1. The protozoa were identified as the monadidae protozoa. No similar peak or monadidae protozoa occurred in the sludges in reactor No's 1 and 2, which were held at 31° C. The peaks that did occur in the reactors maintained at 31° C. were not as high nor were the microorganisms produced as active as the protozoa produced in the sludge digested at 41° C., as can be seen by a comparison of the oxygen uptake rate graph of FIG. 1.

EXAMPLE II

A second batch run was made in accordance with the foregoing procedure employing five reactors. The reactors were run at various temperatures and had various dissolved oxygen content and initial TVS concentration (TVS) as follows: Reactor No. 1, 26° C., dissolved oxygen 15 mg/l and 0.76% TVS; Reactor No. 2, 29° C., five mg/l dissolved oxygen, and 0.74% TVS; Reactor No. 3, 50° C., 15 mg/l dissolved oxygen, and 0.75% TVS; Reactor No. 4, 40° C., 17 mg/l dissolved oxygen, and 0.72% TVS; and Reactor No. 5, 41° C., 20 mg/l dissolved oxygen, and 0.83% TVS. The sludge in reactors No's 1, 3, 4 and 5 were continuously aerated with pure oxygen and were maintained at the respective temperatures for a period of about 6 days. The sludge in reactor No. 2 was aerated with air and maintained at its respective temperature in the digesting vessel for a period of about 6 days.

Figure 3:
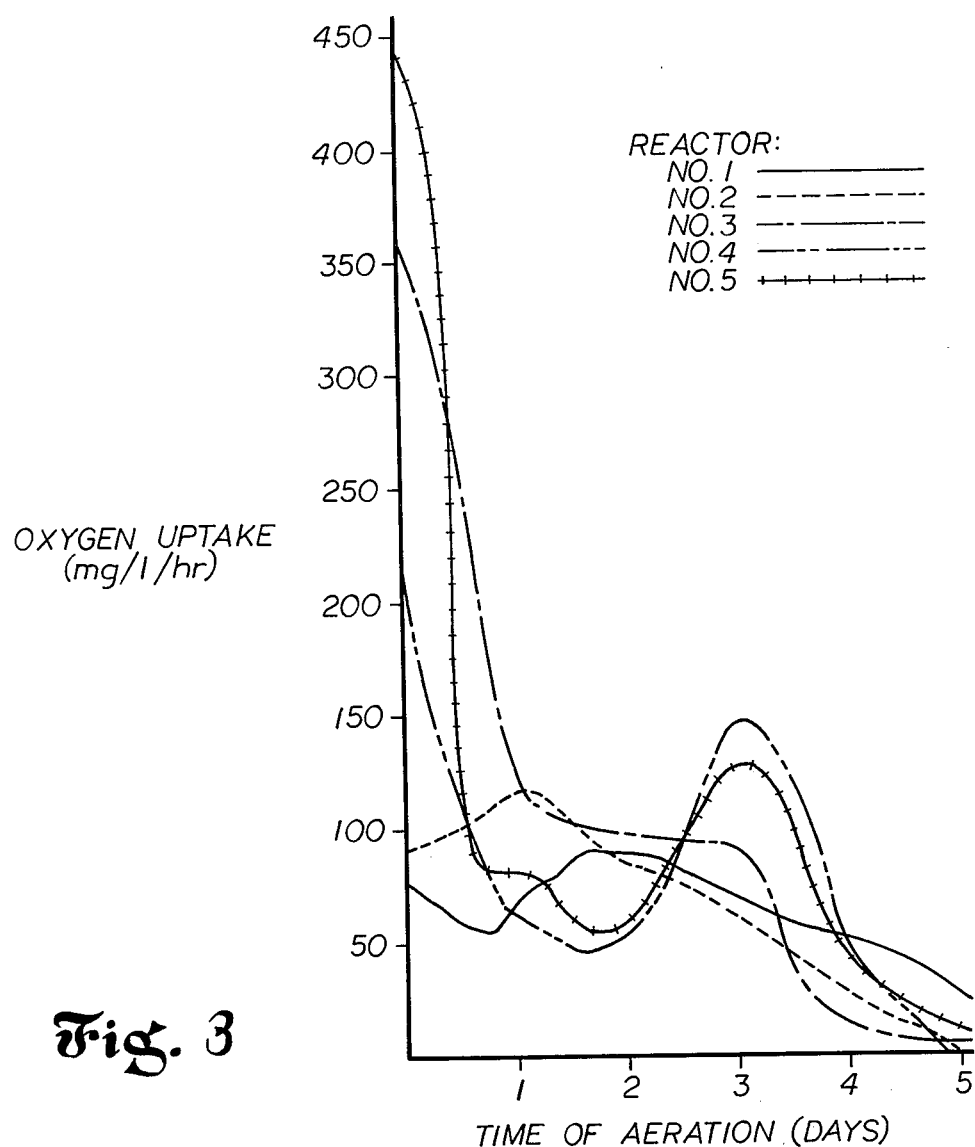

The oxygen uptake rate in mg/l per hour was determined at intervals and in accordance with the foregoing procedure. The results for the sludges in each of the reactors is set forth in the graph of FIG. 3. A peak in oxygen uptake rate occurred at about three days residence in the digesting vessels for the reactor No's. 4 and 5 operated at 40° and 41° C., respectively. No similar peak occurred in reactor No's. 1, 2 and 3, maintained at temperatures of 26°, 29°, and 50° C., respectively.

Continuous flow experiments were run to compare operation of this process with other operating temperatures. It was found that this process could reduce the volatile solids by 50% with only a 3 day detention time while it required five days for a comparable reduction at 30° C., the closest competitor. On a continuous flow basis this process operated at an oxygen uptake rate of 120 mg/l while destroying volatile suspended solids at the rate of 26,300 mg/day.

One of ordinary skill in the art after reading the foregoing specification will be able to make and use the invention. One of ordinary skill will also be able to effect various changes in the process and to substitute equivalents without departing from the concepts disclosed herein. It is therefore intended that the protection granted by patent be limited only by the definition contained in the appended claims.

What is claimed is:
1. An aerobic digestion process for biologically reducing the solids content of an aqueous, biodegradable, organic sludge comprising waste activated sewage sludge, said process comprising the steps of:
   a. introducing said sludge into a vessel under conditions sufficient to maintain the total volatile solids concentration in said vessel at less than about 2.5% by weight; and
   b. maintaining the temperature of said sludge within the range of from about 38° C. to about 46° C. while introducing oxygen into said sludge in an amount effective to promote the growth of Monadidae protozoa and to digest said sludge under aerobic conditions in the presence of Monadidae protozoa.
2. The process of claim 1 wherein the volatile solids in said sludge have a residence time in said vessel of less than about 5 days.
3. The process of claim 1 wherein said sludge in said vessel is maintained at a temperature of from about 41° to about 43° C.
4. The process of claim 1 wherein said sludge in said vessel is maintained at a temperature of about 42° C.
5. The process of claim 4 wherein said process is operated on a continuous basis, the volatile solids in said sludge having a residence time of about three days in said vessel.
6. The process of claim 1 wherein the dissolved oxygen content of said sludge in said vessel is maintained at a level greater than about 3 milligrams per liter.

* * * * *